US010867024B2

(12) United States Patent
Singhal (10) Patent No.: US 10,867,024 B2
(45) Date of Patent: Dec. 15, 2020

(54) SYSTEMS AND METHODS FOR TWO-FACTOR REMOTE USER AUTHENTICATION

(76) Inventor: Tara Chand Singhal, Torrance, CA (US)

(*) Notice: Subject to any disclaimer, the term of this patent is extended or adjusted under 35 U.S.C. 154(b) by 1678 days.

(21) Appl. No.: 11/503,825

(22) Filed: Aug. 13, 2006

(65) Prior Publication Data
US 2007/0042755 A1 Feb. 22, 2007

Related U.S. Application Data (60) Provisional application No. 60/709,955, filed on Aug. 20, 2005.

(51) Int. Cl.
| | |
|---|---|
| *H04M 1/66* | (2006.01) |
| *H04M 1/68* | (2006.01) |
| *H04M 3/16* | (2006.01) |
| *G06F 21/35* | (2013.01) |
| *G06F 21/31* | (2013.01) |
| *H04L 29/06* | (2006.01) |
| *H04M 3/38* | (2006.01) |

(52) U.S. Cl.
CPC .......... *G06F 21/35* (2013.01); *G06F 21/313* (2013.01); *H04L 63/0853* (2013.01); *H04M 3/387* (2013.01)

(58) Field of Classification Search
CPC ... G06F 21/35; G06F 21/313; H04L 63/0853; H04M 3/387
USPC ............. 455/406, 409, 410, 411, 418, 432.1, 455/435.1; 370/310.2; 709/217, 229
See application file for complete search history.

(56) References Cited

U.S. PATENT DOCUMENTS

| | | | | |
|---|---|---|---|---|
| 5,237,612 A | * | 8/1993 | Raith | 380/247 |
| 5,280,581 A | * | 1/1994 | Bathrick et al. | 709/217 |
| 5,297,189 A | * | 3/1994 | Chabernaud | 455/461 |
| 5,315,637 A | * | 5/1994 | Breeden et al. | 455/435.1 |
| 5,325,419 A | * | 6/1994 | Connolly et al. | 455/435.1 |
| 5,329,589 A | * | 7/1994 | Fraser et al. | 379/91.02 |
| 5,526,401 A | * | 6/1996 | Roach et al. | 455/426.1 |
| 5,930,706 A | * | 7/1999 | Raith | 455/422.1 |
| 6,049,712 A | * | 4/2000 | Wallinder | 455/410 |

(Continued)

*Primary Examiner* — Stephen M D Agosta
(74) *Attorney, Agent, or Firm* — Steve Roeder, Esq.

(57) ABSTRACT

This invention discloses a system of remote user authentication to an authentication server, with a telephone interface to the authentication server that only receives routed calls that have originated from a cell phone in a cellular network and a call handling logic function which routs only those calls to the authentication server over the interface that have originated from a cell phone with a subscriber identity module (SIM) card and for which the cellular company maintains an individual subscriber identification data. In a different embodiment a remote user authentication system has different interfaces and different authentication processes that correspond with a telephone network interface and with a cellular telephone company network interface, enabling the authentication system to have different methods of authentication depending upon which interface a remote user connection authentication request originated from. The method uses the SIM card of a cell phone as a "something you have" factor as part of a two-factor authentication mechanism to an authentication server. The telephone network uses a call back feature.

14 Claims, 5 Drawing Sheets

(56) References Cited

U.S. PATENT DOCUMENTS

| | | | |
|---|---|---|---|
| 6,230,002 B1* | 5/2001 | Floden et al. | 455/411 |
| 6,393,271 B1* | 5/2002 | Dougherty | 455/411 |
| 6,538,996 B1* | 3/2003 | West et al. | 370/238 |
| 6,542,500 B1* | 4/2003 | Gerszberg et al. | 370/354 |
| 6,775,285 B1* | 8/2004 | Moles et al. | 370/392 |
| 6,788,770 B1* | 9/2004 | Cook et al. | 379/100.01 |
| 6,795,701 B1* | 9/2004 | Baker et al. | 455/411 |
| 7,003,282 B1* | 2/2006 | Ekberg | 455/411 |
| 7,155,526 B2* | 12/2006 | Chaudhary et al. | 709/229 |
| 7,489,918 B2* | 2/2009 | Zhou et al. | 455/411 |
| 2002/0015480 A1* | 2/2002 | Daswani et al. | 379/88.17 |
| 2004/0229597 A1* | 11/2004 | Patel | 455/411 |
| 2006/0046693 A1* | 3/2006 | Tran et al. | 455/411 |
| 2006/0050680 A1* | 3/2006 | Naim et al. | 370/352 |

* cited by examiner

Figure 1

| |
|---|
| Adapting a server to receive only those incoming telephone calls from a service customer that are originated by the customer on a cellular network 52 |
| Forwarding, by the cellular network only those calls that have been verified by the cell service provider having a customer identity verified account with the cell company. 54 |
| Matching the caller id of the incoming call with a caller id that is pre-stored in database 34, as an equivalent to a "what you have" factor of remote user authentication. 56 |
| Annunciating an "unauthorized call" message if not matched, otherwise a greeting message for the service. 58 |
| Prompting by the IVR 33, for entry of PIN as a second factor of "what you know" of remote user authentication. 60 |
| Verifying the service customer by entry of a personal identification number matching it in the stored database before authenticating the user. 62 |
| Providing a service to the service customer. 64 |

Authentication Process A  31

Prompting by an interactive response system of the authentication system, for entry of a PIN-1.  31A Verifying PIN-1 in an authentication database and delivering a message of an "To hang up now" otherwise a message of "an unauthorized call".  31B Calling back by the system on a caller id that is present for this PIN-1 in the database immediately after step 31B.  31C Prompting for entry of PIN-2, and checking it in database to Authenticate to authenticate the remote user.  31D

Authentication Process B  32

Verifying and Checking the incoming caller id for a match in an authentication system database.  32A Prompting by an interactive response system of the system, if caller id is in database for entry of a PIN, otherwise delivering a message of an unauthorized call.  32B Verifying the PIN in the database to authenticate the remote user.  32C

SYSTEMS AND METHODS FOR TWO-FACTOR REMOTE USER AUTHENTICATION

CROSS REFERENCE TO RELATED APPLICATIONS

This application claims priority on Provisional Application Ser. No. 60/709,955, entitled "Method And Apparatus For Two-Factor Remote User Authentication" filed on Aug. 20, 2005, by Tara Chand Singhal. The contents of the Provisional Application Ser. No. 60/709,955 are incorporated herein by reference.

FIELD OF THE INVENTION

The present invention is directed to systems and methods for two-factor remote user authentication that does not use a security token of prior art and uses certain features of the telephone network.

BACKGROUND

In the science of remote user authentication, there are three different factors by which a remote user to a system such as a server on an Internet or computer network may be authenticated. These three factors are: (i) "what you know", which could be a personal identification number, an alpha-numeric password or a phrase; (ii) "what you have", which could be a smart card or a security token in the personal possession of a user, that is given to the user by the business which owns or manages the network; and (iii) "what you are", which is a biometric measure of the user such as fingerprint, retina print, handprint etc. requiring a biometric sensor.

For the "what you have" factor, companies such as RSA Data security and ActivCard, to name a few, make security tokens. These security tokens may be and usually are hardware and software devices embedded with logic and codes that are personalized for the remote user. Such tokens may have an interface by which they are read by an interface device to the computer network, or they may generate a code, which is then used by the user to enter in a device or screen as part of "what you have" factor. Or they may be static cards such as an ATM card with a magnetic strip.

In each of these factors, each factor has its own issues of reliability and security that are well described in the industry news and publications. The information security industry considers the use of any one of these factors as a one-factor authentication or as a weak form of remote user authentication and considers the use of any two-factors as a two-factor authentication or a strong form of remote user authentication.

Where ever a two-factor authentication is used or required, the use of "what you know" and "what you have" are the factors of choice that are used. The "what you have" factor requires the use of a security token, as described above, and that requires the purchase, personalization and distribution of such tokens to the users at a considerable cost. For this reason, such security tokens are mostly used by employees of a business and are not distributed or given to the customers of a business. There are many business applications where the access to the application over the Internet needs to be given to the business's customers. A classic example is online access to business data or online access to banks where the number of such customers is in hundreds of thousands if not in millions.

In light of the above, it is an objective of the present invention to have systems and methods that enables two-factor remote user authentication without a security token and biometrics and that would be easy to scale up to large number of users and customers of a business.

SUMMARY

In prior art, depending upon where a telephone call originates, a caller has the freedom to set up and make his own caller id. For example, for calls that originate in a Private Branch Exchange (PBX), the caller id is programmed by the PBX owner and may be set up to be any number. In calls originating in an Internet Protocol (IP) based phone, the caller id is made up by the call originator and it is merely forwarded by the telephone network. Hence, in prior art, at the call destination, such as at computer system that may be a part of a remote authentication system, there is no assurance that the caller id is reliable and can be relied upon to uniquely identify and authenticate a caller.

The current invention discloses that the Subscriber Identity Module (SIM) card of a cell phone may be used and would work equally well as a "what you have" factor of remote user authentication with added features of this invention and that may replace the prior art security tokens. GSM based cell phones use a Subscriber Identity Module (SIM) card. The SIM card provides identity verification and authentication as well as confidentiality of the communication to the cell phone company.

When a call originates over a cell phone, the cell service provider generates the caller id that is mapped from the SIM. The SIM, a personalized and coded physical card, is embedded in the phone and the phone is in the personal possession of the caller. Hence, when the call destination system is assured with the features of this invention that the call originates on the cell phone via a cell network, the caller id is relied upon by the destination system. This invention discloses features and different embodiments that assure a call destination system that the caller id can be relied upon as an equivalent "what you have" factor for identification and authentication.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts. The drawings are.

DESCRIPTION

Figure 1:
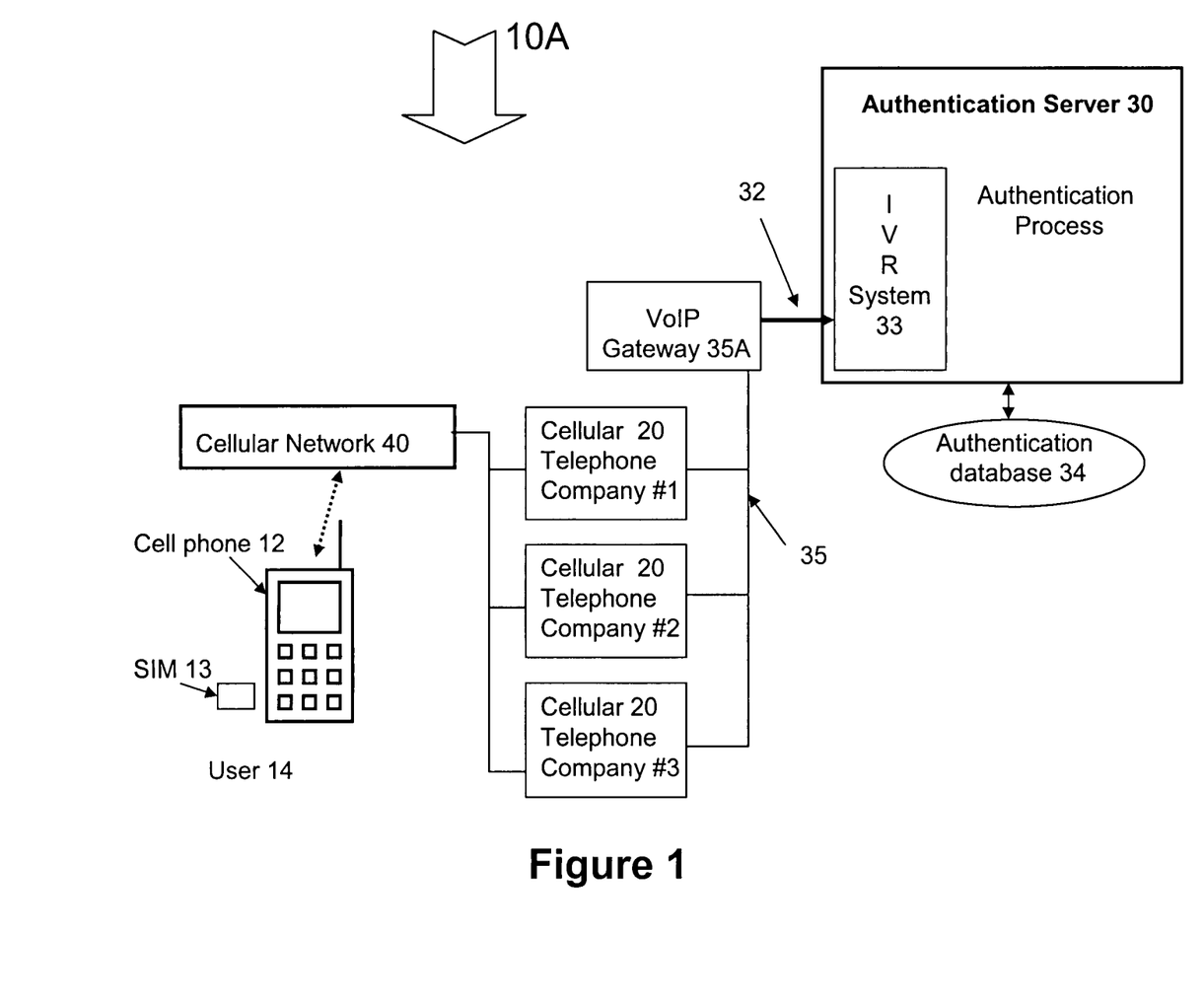
FIG. 1 is a block diagram that illustrates a version of the current invention of a two-factor authentication system.
Figure 2:
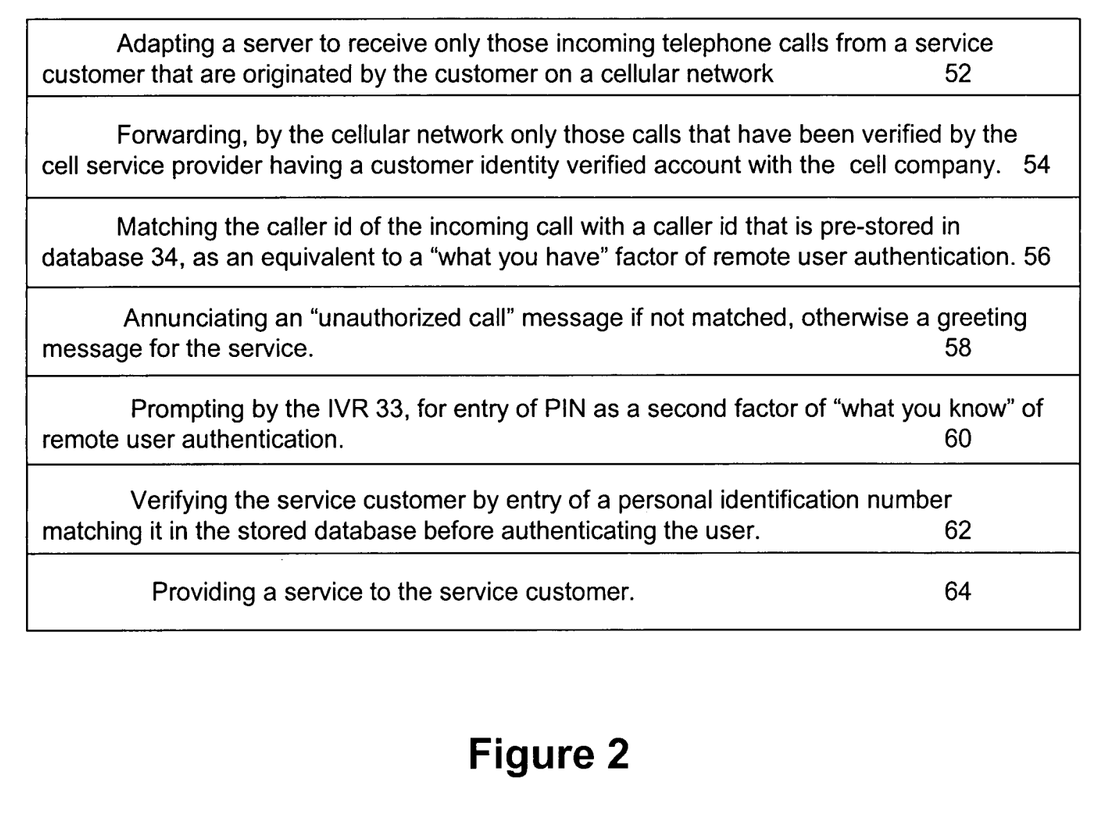
FIG. 2 is a flow diagram that illustrates a version of the current invention of a two-factor authentication system.

This invention discloses two embodiments of a two-factor remote user authentication system. FIGS. 1 and 2 describe the system and method of the first embodiment and FIGS. 3 and 4 describe the system and method of the second embodiment. FIG. 5 describes the features of a call handling logic in the cell network that is used by these embodiments.

The embodiment 10A, as in FIG. 1, discloses a system of remote user authentication to an authentication server 30 that has a telephone interface 32 to the authentication server 30 that only receives routed calls that have originated from a cell phone 12 in a cellular network 40 by a user 14.

The cellular network 40 operated by the cell companies 20 has a call handling logic function 44 (described later with reference to FIG. 5), which routes only those calls to the authentication server 30 over the interface 32 that have originated from a cell phone with a subscriber identity module (SIM) card 13 and for which the cellular company maintains an individual subscriber identification data.

The authentication server 30 may be adapted with an IVR system 33 and may receive routed calls from all the companies 20 via a private landline 35. To handle large volume of calls simultaneously, a VoIP gateway 35A may also be used. The authentication server 30 may use an authentication database 34, which maintains authentication data including the caller id data of the users.

With reference to FIG. 2, a method of remote user authentication to a service system on a global computer network has the following steps. Not all the steps may be needed and used in the order specified herein.

At Step 52, adapting a server to receive only those incoming telephone calls from a service customer that are originated by the customer on a cellular network. This is done by interfacing the server with a private line corresponding to a private number managed by a cell network for receiving cellular network originated calls.

At step 54, forwarding only those calls, by the cellular networks, that have been verified by the cell service provider having a customer identity verified account with the cell company.

At step 56, matching the caller id of the incoming call with a caller id that is pre-stored in database 34, as an equivalent to a "what you have" factor of remote user authentication.

At step 58, annunciating an "unauthorized call" message if not matched, otherwise a greeting message for the service.

At step 60, prompting by the IVR 33, for entry of PIN as a second factor of "what you know" of remote user authentication.

At step 62, verifying the service customer by matching the entered personal identification number with what is stored in the database before authenticating the user.

At step 64, providing a service to the service customer. The service may by delivery of information such as, pass code to a system enabling the customer to have a service from the service system, or providing an access code to gain entrance to a facility, or providing an access code to gain entry to an automated teller machine, or providing access code to gain access to a computer network.

Alternatively the authentication server coupled with a service system may directly deliver services the service customer is authorized to receive such as, a banking transaction via the phone, and other similar services.

Figure 3:
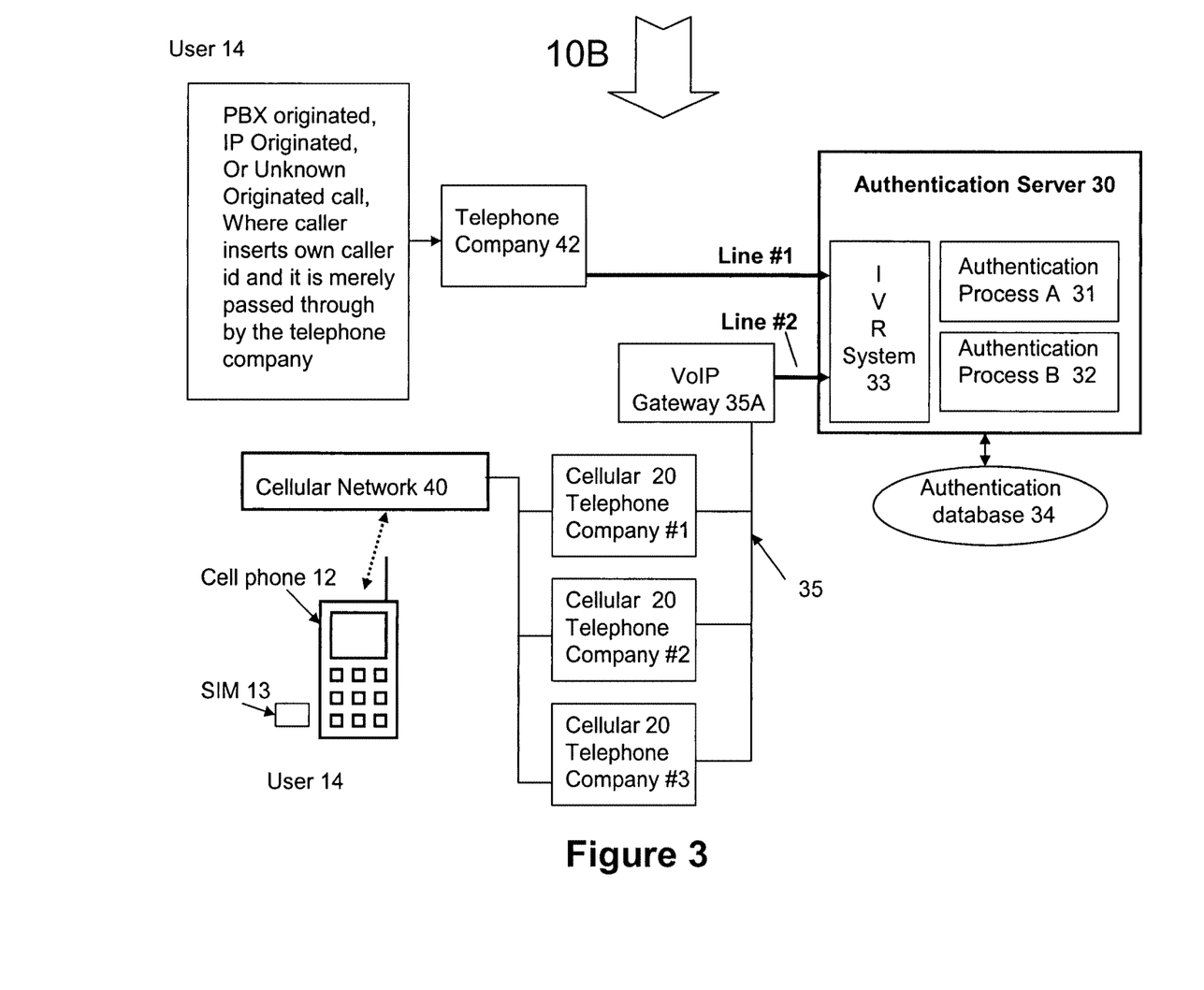
FIG. 3 is a block diagram that illustrates another version of the current invention of a two-factor authentication system.

The embodiment 10B described with reference to FIG. 3 uses two different interfaces line #1 and line #2 for remote user authentication. One of these interfaces, line #2 is the one described in embodiment 10A with the help of FIG. 1 and the other interface line #1 is for those calls that do not originate on a cell network 40.

The embodiment 10B includes an authentication server 30 with an authentication database 34 that pre-stores data used for authentication, two different telephone line interfaces, line #1 and line #2 that are handled by two different authentication processes, and processes A 31 and B 32 respectively in the authentication server 30. The server 30 also has an interactive voice response (IVR) system 33 that may be part of server 30 or it may be a separate server.

The authentication process A 31 handles telephone calls from user 14, over line #1 originating from devices and networks and may include phone calls that originate via a private branch exchange (PBX) or via a world phone that originates calls via the IP protocol and use the Internet, or from the other parts of a public switched telephone network, such as line from a home or business. In all these methods or devices or networks, the user 14 may be able to insert or may be in control of creating or inserting a caller id of his/her own choosing. Such originated calls are merely forwarded to the destination by the prior art telephone company 42 network without verifying the caller id.

The authentication process B 32 handles telephone calls originating over a cellular telephone network 40 from user 14 with a cell phone 12 embedded with a SIM card 13 via one or more different cellular telephone companies 20 over a private line #2. The line #2 is a private line to authentication server 30 and handles or delivers only those calls to the server 30 that originate over the cellular network 40. The private line #2 may be equipped with a VoIP gateway to be able to handle a large volume of simultaneous calls over line #2.

Figure 4:
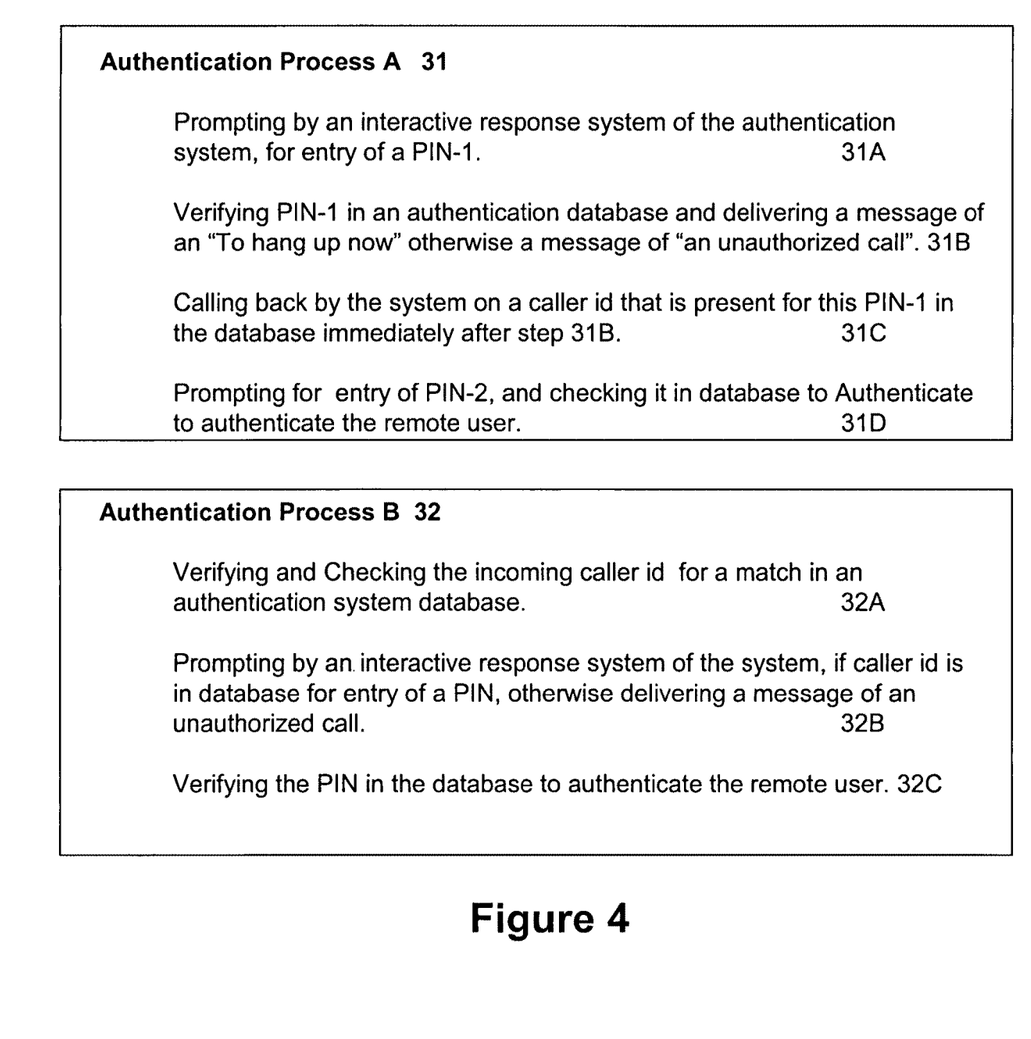
FIG. 4 is a flow diagram that illustrates a version of the current invention of a two-factor authentication system.
Figure 5:
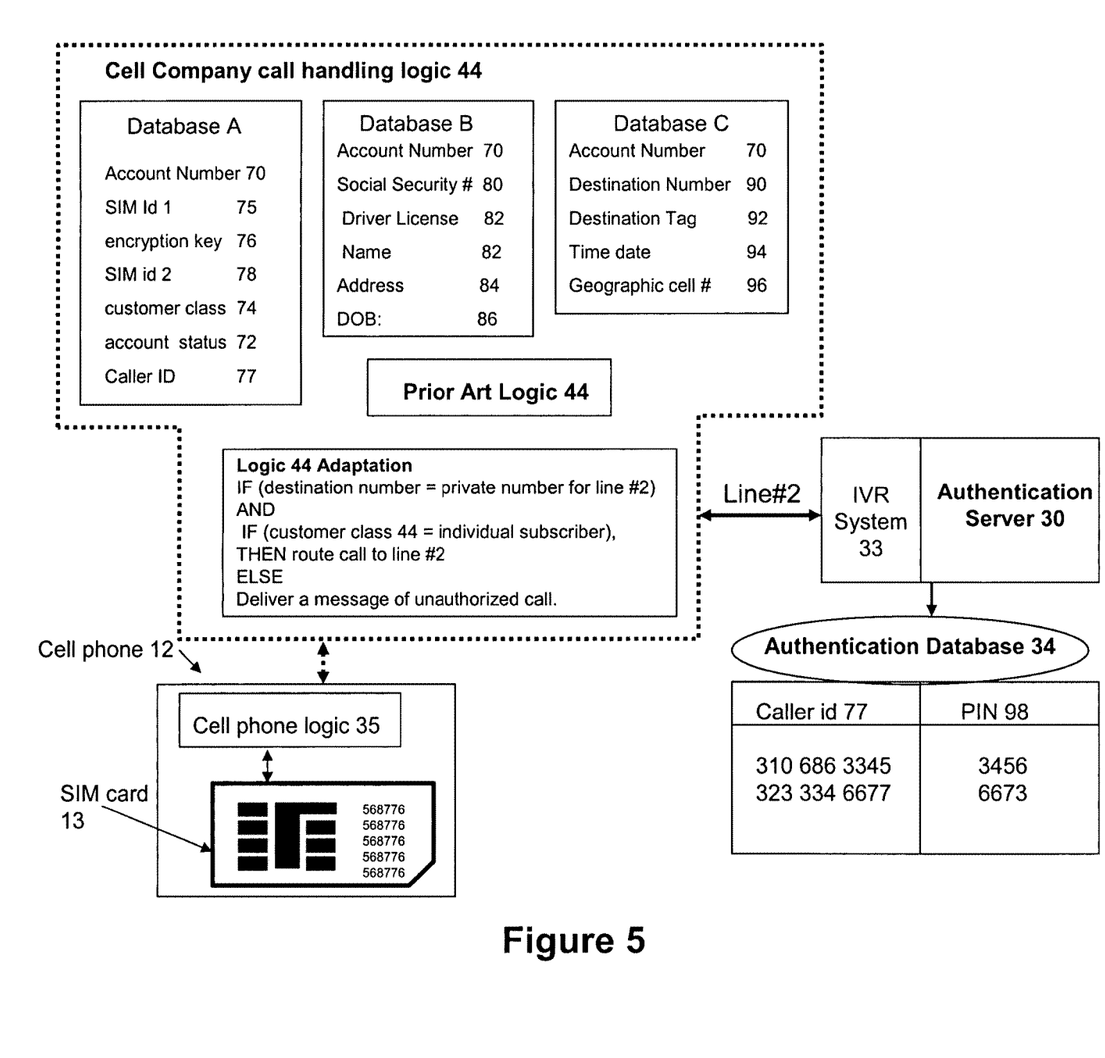
FIG. 5 is a version of the block diagram of call handling logic of the current invention of a two-factor authentication system that may be used by a cellular network.

FIG. 4 describes the steps of these two authentication processes, the process A 31 and process B 32.

In the authentication process A 31, at step 31A, prompting by the interactive voice response (IVR) 33 system of the authentication server 30, for entry of a PIN-1.

At step 31B, first verifying PIN-1 in the authentication database 34, then delivering a voice message of either "hang up now" or a message of "an unauthorized call", depending upon the verification of PIN-1.

At step 31C, calling back by the server 30, immediately after step 31B, on a caller id that is present for this PIN-1 in the database 34. The call back to a caller id that is pre-stored, to caller by server 30 serves as an equivalent of "what you have" factor of authentication.

The PIN-1 may be the caller id of the caller, or it may be the caller id plus a secret number pre-stored in the authentication database 34. As an illustration, the database 34 may store multiple caller ids, called primary caller id and one or more secondary caller ids. For example, the primary caller id is of a primary phone, and the secondary caller ids are of other phones to which the user has control or access to such as home phone, office phone etc. The PIN-1 may be the primary caller id plus the four digits of the secondary caller id. When a PIN-1 is used as described here, the primary caller id may be used to identity caller in the database 34, and the four digits of the secondary caller id may be used to identity which of one of the secondary caller id numbers the caller should be called back in step 31C.

At step 31D, prompting for entry of PIN-2 by the IVR 33 and then checking the entered PIN-2 in database 34 to authenticate the remote user with a "what you know" factor of remote user authentication.

PIN-2 as described here is a secret number known only to the caller and the authentication database 34. The last four digits of PIN-1 may also be a secret number like PIN-2, and PIN-1 and PIN-2 may be the same.

Alternatively, at step 31A, the authentication process A may advise all callers to call on a cellular network. Cell phones are used by masses, are available to everyone, and are very economical to own.

In the authentication process B 32, the user 14 uses a cell phone 12, and the cellular network 40. Then at step 32A, the server 30 checks the incoming caller id for a match in the authentication system database 34 as a "what you have" factor of authentication. If there is no match, delivering the message "unauthorized call, please hang-up". Otherwise proceeding with step 32B.

At step 32B, prompt by the interactive voice response system 33 of the server 30, for entry of a PIN and receiving an entry of a PIN.

At step 32C, verifying the entered PIN in the authentication database 34 to authenticate the remote user as a "what you know" factor of authentication.

In the authentication system 10B, either authentication process A is used or authentication process B is used depending upon how the call originated. If the call originated on a cell phone, then the SIM card of the cell phone maps to the caller id of an individual person. If the call originated from a phone other than the cell phone, the caller id is not reliable as there are many instances where the telephone company does not originate or verify the caller id but passes through the caller id as it is entered by the caller.

System 10B allows the user the flexibility to use any phone such as cell phone, home phone, or office phone for remote user authentication. Once a caller is authenticated via either process A or B to the server 30, the server then can deliver any number of services. Such services may include creation and delivery of a temporary password for access to a system, delivery of other services such as routing the connection to an online bank telephone network for banking transaction via the phone.

Additional services may also be delivered by the server 30, which a caller is authorized to receive. Such services may be from a group that includes, providing an access code to gain entrance to a facility and providing an access code to gain access to an automated teller machine.

FIG. 5 illustrates the call handling logic 44 provided by the cell companies 20 of the cellular network 40 and an adaptation of that logic 44 of this invention that assures the authentication server 30 the reliability of caller id, for the calls that originate on a cell phone 12.

The cell phone 12 has a SIM card 13 and a cell phone logic 35 that interfaces to a cell company call handling logic 44 via wireless, using radio frequency waves.

The logic 44 may have three different databases A, B and C to facilitate logic 44. The database A may maintain data fields such as account number 70, account status 72, customer class 74, SIM id 1 75, encryption key 76, caller id 77, and SIM id 2 78. The database B may maintain subscriber personal data such as account number 70, social security number 80, driver license 82, name 82, address 84, and date of birth 86. The database C may maintain data such as account number 70, destination number 90, destination tag 92, time and date 94 and geographic cell at time of call origination 96.

The logic 44, when it receives a request for connection from a cell phone 12, identifies the caller via SIM id1 75 in its database A. Then the logic 44 finds the corresponding encryption key 76 of SIM and decrypts a secondary SIM id 2 78 as the serial number SIM Id 2 78 is encrypted. It is verified in the database A after decryption using the key 76.

The logic 44 having verified the origin of the call from the SIM card 13, as described above, then checks the account status 72 by account number 70. The account status 72 enables the phone company to restrict the routing of the call to the destination. For example, if the payment is overdue or the minutes on a prepaid phone have expired, or call is to an outside area, the call routing to the destination is disabled and a message is delivered to the caller about the status of the account.

The logic 44 also creates a log of all calls as shown in database C. The log may include, destination tags 92, based on destination number. For example, mobile-to-mobile (MTM) calls are tagged as MTM. Other type of calls such as mobile to land line call are also tagged if different rate schemes are applicable. Other log items are, destination number 90, time and date 94 of the call, and geographic cell location 96 of call origination.

The logic 44 as described above is prior art. The current invention provides for an adaptation to logic 44. This adaptation provides for a function that enables the cell phone company 20 to forward or route only those calls to a destination number for line #2 that have an individual subscriber identity in database B and block all other calls from being routed to line #2.

The adaptation to logic 44 checks the customer class 74. The customer class 74 represents types of customers such as, (i) individuals who have been individually registered and whose identity has been established and checked by various means, (ii) business owners, who may distribute the phone to different employees at different times and (iii) prepaid phones, where the identity of phone user is not relevant as he/she has prepaid for a fixed number of minutes of phone.

If the customer calls from an individually subscribed phone, the phone company maintains and has verified the subscriber's personal identity data such as social security number, driver license number, name and address in database B.

The adaptation forwards only those calls that are from individually subscribed cell phones and excludes other cell phone calls to the server 30 on line #2.

With the adaptation of logic 44, when a call is received over line #2, it would have an assured caller id that has been mapped from an individual subscriber whose identity has been verified by the cell phone company. With this assurance of traceability from the SIM card to the cell company account and then to the caller's caller id, coupled with the fact, that a detailed log is kept of the call to include the geographic cell, the adaptation converts a SIM of a cell phone as a "what you have" factor of authentication of this invention and is able to exclude other calls on line #2.

This adaptation to prior art logic 44 may also include a check for an account type and for certain account types would proceed to route the call to the destination number assigned to line #2 and for other types of accounts provide a message of "unauthorized call" to the caller.

In prior art, the telephone companies track different types of calls based on origination and destination numbers, such as Mobile To Mobile or land line to mobile. The adaptation of this feature enables those calls that are directed to line #2 to server 30 to be processed through a more stringent or different process then prior art logic 44 alone.

The adaptation to logic 44 may also be stated as:

IF (destination number = private number for line #2)
AND
IF (customer class 74 = individual subscriber), -continued

```
THEN route call to line #2
ELSE
Deliver a message of unauthorized call.
```

Hence, when the authentication server 30 receives a call from user 14 over cellular network 40 over line #2, the cellular company 20 has processed the call via the adapted logic 44 of this invention.

This provides an assurance that the caller id is reliable because it maps to a SIM card 13 that is in the cell phone 12 in personal possession of a person 14 and that SIM maps to an account number 70 and account status 72 and that account maps to an individual subscriber person in the phone company databases B, a person which the company has identified by personal data verification as in database B. The cell companies 20 may also employ many methods and procedures that are not described above to establish the identity and verification of calls that their networks handle.

These features, as described above enable a SIM card 13 to act in the manner of a "something you have" factor. Supplementing that with using a PIN 98 to verify the caller acts in manner of "something you know" factor. Hence a two-factor authentication is achieved by this invention without the user having to physically carry a security token, and without an authentication business entity having to purchase, provision, initialize and distribute such tokens to the users and potential users desiring authentication to a remote server.

SIM may change when changing phones or companies, but caller id stays same across telephone companies and across phones if phones are replaced. Hence this form of caller id that originates via cell phone company is a stable number that serves to identify a person by a "what you have" factor to an authentication server 30.

As a second factor of authentication, the entry of data such as PIN 98 in the cell phone is protected by SIM based encryption during transmission of PIN and SIM data between the cell phone and the cell tower.

In brief, the systems 10A or 10B serve to authenticate the user 14 to server 30 via a two-factor remote user authentication that does not use prior art security tokens, instead use a SIM card as one of the factors, that is the SIM card of the cell phone acts as a "something you have factor" of a two factor remote user authentication process. In another alternate method, a call back feature by the server 30 to a pre-stored telephone number acts to server as a "what you have factor" of a two factor remote user authentication process.

While the particular method and apparatus as illustrated herein and disclosed in detail is fully capable of obtaining the objective and providing the advantages herein before stated, it is to be understood that it is merely illustrative of the presently preferred embodiments of the invention and that no limitations are intended to the details of construction or design herein shown other than as described in the appended claims.

What is claimed is:

1. A system for a multi-factor remote user authentication service (RUAS), the system comprising: a) an authentication server of a business for authenticating a remote user to a business system of the business on a global computer network, wherein the authentication server has an interface with a cellular wireless telephone network for receiving voice calls from a mobile wireless device of the remote user operating in the cellular wireless telephone network of a wireless carrier; b) a security device in the physical possession of a remote user, for a "what you have" factor of remote user authentication, wherein the security device is simulated by a SIM card of the mobile wireless device of the remote user, and wherein the SIM card in the mobile wireless communication device has a caller id assigned by the wireless carrier; c) a call handling logic in the wireless carrier that screens incoming calls from the mobile wireless device for having been originated by an account holding customer of the wireless carrier and routes the screened calls to the authentication server on a private number having been pre-assigned to the authentication server by the wireless carrier, and wherein, the authentication server receives incoming voice calls only from the mobile wireless device; d) the authentication server has a first logic that screens incoming calls received on the private number based on the caller id having been pre-stored in an authentication database and the authentication server has a second logic that generates a random, limited character alphanumeric, as a pass code, and has an IVR subsystem that voice delivers the pass code to the mobile wireless device for use for authenticating the remote user to the business system, and thereby the system provides a multi-factor RUAS, wherein the SIM card of the mobile device functions as the security token for the first factor of the RUAS and the pass code serves as the password for the second factor of "what you know" authentication; and further based on receiving a numeric personal identification number, having been also pre-stored in the authentication database and wherein, the authentication server uses the SIM card of the mobile wireless device as the security token in the physical possession of the remote user for the "what you have" factor of remote user authentication to the RUAS, as part of the multi-factor remote user authentication system.

2. The system as in claim 1, further comprising: the first logic on finding a caller id match in the authentication database annunciates a message of "enter personal identification number", for requesting and receiving the numeric personal identification number, otherwise annunciates "unauthorized call".

3. The system as in claim 1, comprising: the system authorized to deliver services to the remote authorized to receive by a number of means that include from a group of, delivering a temporary password for access to a system, routing the connection to an online bank telephone network for banking transaction via the phone.

4. The system as in claim 1, comprising: the system authorized to deliver services to the remote user authorized to receive by a number of means that include from a group of, providing an access code to gain entrance to a facility, providing an access code to gain entry to an automated teller machine.

5. The system as in claim 1, further comprising: is the call handling logic function routs only those calls to the authentication server over the private line that have originated from a cell phone with a subscriber identity module (SIM) card and for which a cellular telephone service company maintains an individual subscriber identification data.

6. The system as in claim 1, further comprising: the call handling logic does not route those calls to the authentication server over the private line that have originated from a cell phone with the SIM card, but for which the cellular company does not maintain an individual subscriber identification data including from a group of, for prepaid phones and phones that are owned by business 25 entities.

7. A system for a mufti-factor remote user authentication service (RUAS), the system comprising: a) an authentication server of a business for authenticating a remote user to a business system of the business on a global computer network, wherein the authentication server has an interface with a cellular wireless telephone network for receiving voice calls from a mobile wireless device of the remote user operating in the cellular wireless telephone network of a wireless carrier; b) a security device in the physical possession of a remote user, for a "what you have" factor of remote user authentication, wherein the security device is simulated by a SIM card of the mobile wireless device of the remote user, and wherein the SIM card in the mobile wireless communication device has a caller id assigned by the wireless carrier; c) a call handling logic in the wireless carrier that screens incoming calls from the mobile wireless device for having been originated by an account holding customer of the wireless carrier and routes the screened calls to the authentication server on a private number having been pre-assigned to the authentication server by the wireless carrier, and wherein, the authentication server receives incoming voice calls only from the mobile wireless device, further comprising: the call handling logic of the wireless carrier screens incoming calls between (i) calls that originate in the cellular telephone network of the carrier from customers of the cellular wireless carrier and thus have a verifiable caller identity data in the carrier's own database and (ii) all other calls that have originated from other telephone networks and have been forwarded to the cellular telephone network of the carrier for routing to customers of the wireless carrier; b. the call handling logic then routes only those incoming calls to the authentication server on the private line that have originated in its own network from its io own customers and thus is able to provide an assurance of their caller identity data to the authentication server for the authentication server to use such caller id data as part of the multi-factor remote user authentication service; and d) the authentication server has a first logic that screens incoming calls received on the private number based on the caller id having been pre-stored in an authentication database and further based on receiving a numeric personal identification number, having been also pre-stored in the authentication database and wherein, the authentication server uses the SIM card of the mobile wireless device as the security token in the physical possession of the remote user for the "what you have" factor of remote user authentication to the RUAS, as part of the multi-factor remote user authentication system.

8. A method for a multi-factor remote user authentication service (RUAS), the system comprising the steps of: a) providing an authentication server of a business for authenticating a remote user to a business system of the business on a global computer network, wherein the authentication server has an interface with a cellular wireless telephone network for receiving voice calls from a mobile wireless device of the remote user operating in the cellular wireless telephone network of a wireless carrier; b) providing a security device in the physical possession of a remote user, for a "what you have" factor of remote user authentication, wherein the security device is simulated by a SIM card of the mobile wireless device of the remote user, and wherein the SIM card in the mobile wireless communication device has a caller id assigned by the wireless carrier; c) providing a call handling logic in the wireless carrier that screens incoming calls from the mobile wireless device for having been originated by an account holding customer of the wireless carrier and routes the screened calls to the authentication server on a private number having been pre-assigned to the authentication server by the wireless carrier, and wherein, the authentication server receives incoming voice calls only from the mobile wireless device; d) providing in the authentication server a first logic that screens incoming calls received on the private number based on the caller id having been pre-stored in an authentication database and further based on receiving a numeric personal identification number, having been also pre-stored in the authentication database and further comprising the steps of: providing by the authentication server has a second logic that generates a random, limited character alphanumeric, as a pass code, and has an IVR subsystem that voice delivers the pass code to the mobile wireless device for use for authenticating the remote user to the business system, and thereby the system provides a multi-factor RUAS, wherein the SIM card of the mobile device functions as the security token for the first factor of the RUAS and the pass code serves as the password for the second factor of "what you know" authentication; and wherein, the authentication server uses the SIM card of the mobile wireless device as the security token in the physical possession of the remote user for the "what you have" factor of remote user authentication to the RUAS, as part of the multi-factor remote user authentication system.

9. The method as in claim 8, further comprising the steps of: providing by the first logic on finding a caller id match in the authentication database annunciates a message of "enter personal identification number", for requesting and receiving the numeric personal identification number, otherwise annunciates "unauthorized call".

10. The method as in claim 8, further comprising the steps of: providing by the system authorized to deliver services to the remote authorized to receive by a number of means that include from a group of, delivering a temporary password for access to a system, routing the connection to an online bank telephone network for banking transaction via the phone.

11. The method as in claim 8, further comprising the steps of: providing by the system authorized to deliver services to the remote user authorized to receive by a number of means that include from a group of, providing an access code to gain entrance to a facility, providing an access code to gain entry to an automated teller machine.

12. The method as in claim 8, further comprising the steps of: routing by the call handling logic function only those calls to the authentication server over the private line that have originated from a cell phone with a subscriber identity module (SIM) card and for which a cellular telephone service company maintains an individual subscriber identification data.

13. The method as in claim 8, further comprising the steps of: routing not by the call handling logic does those calls to the authentication server over the private line that have originated from a cell phone with the SIM card, but for which the cellular company does not maintain an individual subscriber identification data including from a group of, for prepaid phones and phones that are owned by business entities.

14. A method for a multi-factor remote user authentication service (RUAS), the system comprising the steps of: a) providing an authentication server of a business for authenticating a remote user to a business system of the business on a global computer network, wherein the authentication server has an interface with a cellular wireless telephone network for receiving voice calls from a mobile wireless device of the remote user operating in the cellular wireless telephone network of a wireless carrier; b) providing a security device in the physical possession of a remote user, for a "what you have" factor of remote user authentication, wherein the security device is simulated by a SIM card of the mobile wireless device of the remote user, and wherein the SIM card in the mobile wireless communication device has a caller id assigned by the wireless carrier; c) providing a call handling logic in the wireless carrier that screens incoming calls from the mobile wireless device for having been originated by an account holding customer of the wireless carrier and routes the screened calls to the authentication server on a private number having been pre-assigned to the authentication server by the wireless carrier, and wherein, the authentication server receives incoming voice calls only from the mobile wireless device; d) providing in the authentication server a first logic that screens incoming calls received on the private number based on the caller id having been pre-stored in an authentication database and further based on receiving a numeric personal identification number, having been also pre-stored in the authentication database the call handling logic further comprising the steps of: a. providing by the call handling logic of the wireless carrier screening incoming calls between (i) calls that originate in the cellular telephone network of the carrier from customers of the cellular wireless carrier and thus have a verifiable caller identity data in the carrier's own database and (ii) all other calls that have originated from other telephone networks and have been forwarded to the cellular telephone network of the carrier for routing to customers of the wireless carrier; b. routing by the call handling logic only those incoming calls to the authentication server on the private line that have originated in its own network from its own customers and thus is able to provide an assurance of their caller identity data to the authentication server for the authentication server to use such caller id data as part of the multi-factor remote user authentication service;

and wherein, the authentication server uses the SIM card of the mobile wireless device as the security token in the physical possession of the remote user for the "what you have" factor of remote user authentication to the RUAS, as part of the multi-factor remote user authentication system.

* * * * *